United States Patent Office 3,389,057
Patented June 18, 1968

1

3,389,057
SKEWED HELICAL WART SPACERS
FOR FUEL ASSEMBLIES
John C. McGregor and Kenneth T. Bates, Port Hope,
Ontario, Canada, assignors to Atomic Energy of Canada
Limited, Ottawa, Ontario, Canada
Filed Apr. 14, 1967, Ser. No. 630,977
3 Claims. (Cl. 176—78)

ABSTRACT OF THE DISCLOSURE

A fuel rod structure for a nuclear reactor is described in which the elements making up the rod are assembled in a cluster and in which each element is separated from its adjacent elements by the affixing of a wart or spacer to the sheath of each element in the region where it will contact the wart of an adjacent element. The warts are of elongated form and each has its longitudinal axis offset from the longitudinal axis of the element to which it is attached. By this means the warts engage one another in crossed-orientation and contact one another over greater limits of lateral or longitudinal offset from their planned position on the elements. Preferably the warts have their longitudinal axes placed on helices whose axes are in the same direction as the longitudinal axes of the elements and in which all helices are in the same sense for all elements in the cluster.

---

This invention relates to fuel rods for use in nuclear reactors and has particular reference to rods which are made up of a cluster of elements of fissile material clad in a sheathing of metal, which is non-reactive with the fissile material and with the coolant or moderator circulating over the sheathing.

In this type of fuel rod it is convenient to make up an assembly of elements such as described in Canadian patent application 910,528 in the names of J. Howieson and J. C. McGregor as inventors and Canadian patent application 910,529 with D. B. Nazzer and J. Pawliw as inventors. In these applications fuel elements are assembled together in a cluster by attachment of their ends to end plates or spiders. To prevent the sheaths of adjacent elements from coming into contact( such as happens when there is warping of an element and which can be caused by differential expansion due to uneven local heating or to other vibrational movement) spacer pads or warts are attached to the sheaths so that contact between adjacent elements takes place only at the warts and no sheath contacts any other surface directly.

Certain points have to be borne in mind in the design and use of warts because if the contacting surface area between warts is too large, excessive heating results, and is followed by an increase of the rate of corrosion attack on the contacting and adjacent surfaces. Additionally the material of which the warts is made is generally parasitic in most reactors since it captures some of the neutrons in the reaction zone. The size of the warts should therefore be kept as small as possible.

It is with these drawbacks of the prior art in mind that the present invention has been developed and provides an effective means for separating the elements of a nuclear reactor fuel rod without being unduly dependent upon manufacturing tolerances and which safeguards the spacing material from overheating and corrosion, and avoids the use of an excessive amount of material.

Figure 1:
Figure 2:
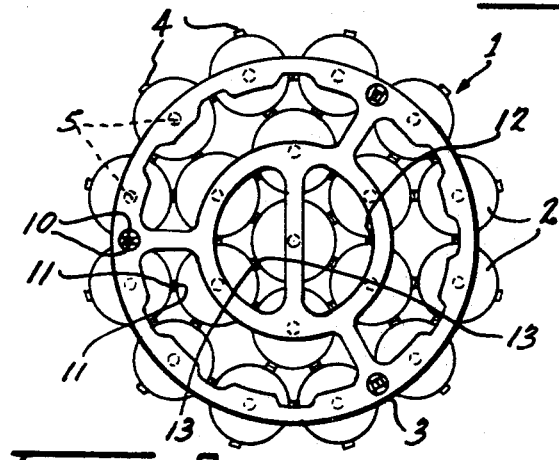
Figure 3:
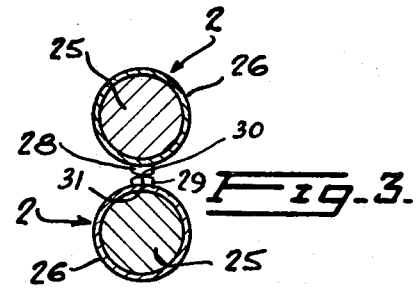
Figure 4:
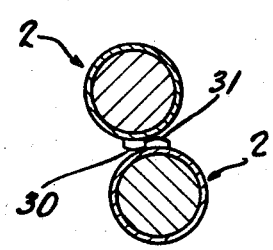
Figure 5:
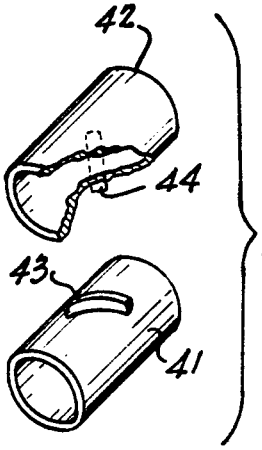
Figure 6:
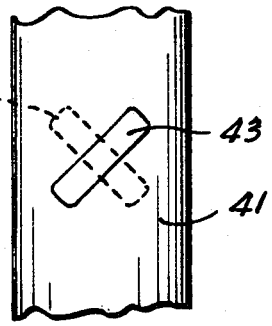

In the description which follows reference will be made to the accompanying drawings in which FIGURE 1 shows a side view of a fuel rod, FIGURE 2 shows an end view of the fuel rod of FIGURE 1, FIGURE 3 shows a view in section through two fuel elements with warts of known simple type, FIGURE 4 shows a possible action occurring with such simple warts under excessive vibration or mis-alignment of the elements, FIGURE 5 shows an arrangement in accordance with the teachings of the present invention which overcomes the problems experienced with simple warts, FIGURE 6 shows an overhead view of two of the new warts in cooperation.

With reference now to FIGURE 1, a fuel rod 1 comprises a cluster of elements 2 which are fastened together by end plates 3 at points 5 (FIGURE 2). A number of wear pads 4 are applied to the outermost members of the cluster so that when the rod is slid into and out of the channel in a nuclear reactor it is these wear pads which will undergo the sliding action and in which any contact between channel and rod will take place. The elements are separated from each other at intervals along their length by warts 10 which can be seen in further detail in FIGURE 2 and which may be supplemented by additional warts 10' and 10" along the length of the rod.

As seen in FIGURE 2 there are warts additional to warts 10 such as warts 11 separating the outer ring of elements 2 from the intermediate ring, warts 12 separating the intermediate ring of elements from one another and warts 13 separating the intermediate ring from the innermost element. The spot weld points 5 at which each element is fastened to an end plate 3 can also be seen in this figure.

While we have here described one type of fuel rod it will be appreciated by those skilled in the art that different packing arrangements may be adopted but in all cases the sections of the elements remote from their ends are separated from one another by the use of these small warts.

FIGURE 3 shows an enlargement in section of part of a fuel rod in which the fissile material 25 and the sheathing 26 on each element can be seen. The warts 28 and 29 are brazed or welded onto the sheathing after having been shaped so that their contour conforms to that of the sheath. In many instances it is convenient to make the facing surfaces 30 and 31 of the warts convex so that the coolant moderator is better able to prevent the formation of local hot spots. The actual contacting surface area between warts is defined as that over which adequate coolant flow is prevented. (Theoretically with the cylindrically convex warts there would be only line contact between them.)

In FIGURE 4 a situation is shown in which can occur when two warts intended to contact each other on their surfaces 30 and 31 become displaced due to the mutual longitudinal shifting of the elements 2 to which they are attached.

In FIGURE 5 a simple but efficient manner for overcoming the problem expressed in FIGURE 4 is shown. In this case an element 41 is intended to be aligned adjacent to an element 42 and separation of the two elements occur by virtue of the warts 43 and 44 respectively. It is seen that these warts 43 and 44 extend in a longitudinal direction but have their longitudinal axes skewed or offset with respect to the axis of the element of which they form part. By appropriate positioning of the warts, crossed-orientation of the two occurs as shown in FIGURE 6. Here wart 44 has been shown in the design position which it will take up against wart 43. It can be seen that this arrangement allows both for misalignment of warts in a direction longitudinally of the element to which they are attached and misalignment in a direction transverse to the longitudinal axis.

In order to construct an element with such warts each wart can be set at a constant helix angle to the axis of the element. The helix for any assembly of elements can be right or left hand, but not both, and, as clearly seen in FIGURE 5, by placing the warts on this unique helix any warts which are positioned to contact one another will do so at crossing rather than parallel angles.

The advantage of operation of these warts in the reactor is that the small size is retained while at the same time all warts effectively engage each other on their intended cooperating surfaces whether these warts have been displaced, either accidentally, or by improper planning, within wide tolerances, in a longitudinal or in a transverse direction to the longitudinal axes of the elements to which they are attached.

We claim:

1. A fuel rod for a nuclear reactor comprising a cluster of a plurality of longitudinally extending fuel elements, each element comprising a sheath and warts affixed to the sheath in regions where the element is to be positively spaced from adjacent elements by engaging only other cooperating warts, wherein the warts are of elongated shape, the elongated shape defining a longitudinal axis for each wart, and the longitudinal axis of each wart being set on a helix with respect to the longitudinal axis of its element, the helix of each wart being in the same sense as that of its cooperating wart.

2. A fuel rod as defined in claim 1 the longitudinal axis of each wart being set on a helix with respect to the longitudinal axis of its element which helix is in the same sense for all elements in the cluster.

3. A fuel rod as defined in claim 2, said warts having convex surfaces, and mutually engaging one another on said convex surfaces.

References Cited

UNITED STATES PATENTS

| | | | |
|---|---|---|---|
| 3,278,388 | 10/1966 | Thome | 176—78 |
| 3,308,034 | 3/1967 | Schmidt | 176—78 |
| 3,324,008 | 6/1967 | Howieson et al. | 176—78 |
| 3,344,036 | 9/1967 | Haslam et al. | 176—78 |
| 3,345,267 | 10/1967 | Nazzer et al. | 176—78 |

CARL D. QUARFORTH, *Primary Examiner.*

M. J. SCOLNICK, *Assistant Examiner.*